United States Patent [19]

Owens

[11] 4,112,461
[45] Sep. 5, 1978

[54] MULTIWAVELENGTH LIGHT BEAM DEFLECTION AND MODULATION

[75] Inventor: James Carl Owens, Pittsford, N.Y.

[73] Assignee: Eastman Kodak Company, Rochester, N.Y.

[21] Appl. No.: 729,622

[22] Filed: Oct. 5, 1976

[51] Int. Cl.² .................... H04N 9/14; G02F 1/33
[52] U.S. Cl. .................................. 358/63; 350/360
[58] Field of Search .......................... 358/60–63, 358/201, 235; 346/108; 350/161 W

[56] References Cited

U.S. PATENT DOCUMENTS

| | | | |
|---|---|---|---|
| 3,524,011 | 8/1970 | Korpel | 358/60 |
| 3,783,185 | 1/1974 | Spaulding | 358/63 |

*Primary Examiner*—John C. Martin
*Attorney, Agent, or Firm*—Warren W. Kurz

[57] ABSTRACT

Apparatus and method are disclosed for diffracting light beams of different wavelengths to form a color image without achromatizing optics. An acoustic wave deflection frequency range is utilized which will result in no more than a predetermined maximum variation of diffraction efficiency and which covers the Bragg-tolerance ranges for all wavelengths used. Because the different wavelength beams will scan at different speeds (covering the same angular deflection during different scan times) intensity modulating information for each wavelength is impressed upon an acoustooptic modulator in the light path at different appropriate rates and during different appropriate periods during the scan. The modulating information for each wavelength is impressed upon the modulator only during that respective time period in which the deflection frequency is within a range that will result in angular diffraction ranges which match for all beams.

12 Claims, 11 Drawing Figures

MULTIWAVELENGTH LIGHT BEAM DEFLECTION AND MODULATION

CROSS REFERENCE TO RELATED APPLICATIONS

Reference is made to commonly assigned, copending U.S. patent application Ser. No. 580,632, filed May 27, 1975 in the name of J. H. Ladd, now abandoned.

BACKGROUND OF THE INVENTION

1. Field of the Invention

This invention relates to acoustooptic apparatus, and more particularly to such apparatus for modulating and diffracting a plurality of beams of different optical wavelenghts such that (1) the diffracted beams scan the same angular range at different scan rates with modulating signals for each beam synchronized to that beam's scan rate and (2) selecting diffracting frequency ranges commensurate with a predetermined maximum variation in diffraction efficiency.

2. Description of the Prior Art

When light beams of different wavelengths are deflected by an acoustooptic device to which an acoustic wave of varying frequency $f$ is applied, the longer wavelength beam will scan a larger deflection angle than the shorter wavelength light for the same acoustic frequency bandwidth $\Delta f$. As background for the following description, it is well known that when an acoustic wave of frequency $f$ and velocity $v$ interacts with a light beam of wavelength $\lambda$, the acoustic wave acts as a diffraction grating which deflects the beam. The angle between the incident beam and the acoustic wavefront is $\theta_i$. For deflection in optically isotropic material, and where the distance across the acoustic wave is greater than $(v/f)^2/\lambda$, the incident light is diffracted only in the first order. This phenomenon is called Bragg reflection, and the incident angle $\theta_i$ which satisfies the following equation is called the Bragg angle $\theta$:

$$\sin \theta = \lambda f / 2v \qquad (1)$$

The Bragg angle $\theta$ is that angle which gives the maximum diffraction efficiency at a given acoustic wave input frequency.

Figure 1:
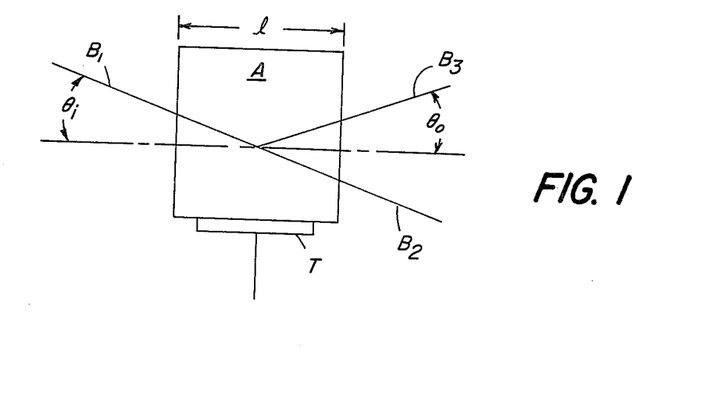
FIG. 1 is a schematic view of an acoustooptic deflector cell.

In FIG. 1 (in which are shown an acoustooptic medium A, a transducer T, an input laser beam $B_1$, an undiffracted beam $B_2$, and a diffracted beam $B_3$), the angles of incidence $\theta_i$ and output $\theta_o$ are defined. If $\theta_i$ is maintained at less than 1°, $\sin \theta_i$ can be approximated by $\theta_i$ and the angle of incidence of the light beam is given by:

$$\theta_i = \lambda f_c / 2v + \delta \qquad (2)$$

where $f_c$ is the design frequency (nominally the center frequency of $\Delta f$) and $\delta$ is an offset from the Bragg angle (i.e., small positive values which broaden the operating bandwidth $\Delta f$ of an acoustically beam-steered device at the expense of a midband dip in response).

In FIG. 1, the angle between the diffracted light beam $B_3$ and the undiffracted light beam $B_2$ is equal to $\xi f/v$; therefore:

$$\theta_o = \frac{\lambda}{v}(f - \frac{f_c}{2}) - \delta \qquad (3)$$

Since $\theta_o$ depends on the acoustic frequency $f$, it is possible to vary the direction of the diffracted light by changing $f$. If the acoustic frequency is swept through a bandwidth $\Delta f$, the diffracted beam will scan through an angular range given by:

$$\Delta \theta_o = (\lambda/v) \Delta f \qquad (4)$$

Light beams of different selected optical wavelengths (such as for example, red, green and blue light beams) may be simultaneously applied to an acoustooptic device, each at an appropriate incident angle $\theta_{ir}$, $\theta_{ig}$ and $\theta_{ib}$, respectively, so that the diffracted beams will be collinear. However, it can be seen from equation (3) that, if the applied frequency $f$ is swept linearly in time, the red beam will scan faster than the green beam, which in turn will scan faster than the blue beam. Hence, the diffracted beams will not remain collinear. This problem of superposition of the three beams to give a single scanning spot, i.e., achromatization, has, in the past, been solved by separating the three beams and inserting a different optical system of mirrors, prisms and/or lenses in each beam. Such a method of achromatization is described by Watson and Korpel in "Equalization of Acoustooptic Deflector Cells in a Laser Color TV System," Applied Optics, Vol. 9, pages 1176–1179 (May 1970).

A second problem occurs with respect to the selection of ranges of acoustic frequencies for different optical wavelenghts while maintaining a suitable efficiency of operation. To obtain maximum efficiency of Bragg diffraction, the incident and diffracted beams should be symmetrical with respect to the acoustic wavefronts, i.e., $\theta_i$ should equal $\theta_o$ in FIG. 1. This condition can hold strictly only for a specific applied frequency $f$. If, in deflecting the light, the diffracted beam angle $\theta_o$ is changed by an amount $\alpha_d$, the angle $\theta_i$ of the incident beam should be changed accordingly to restore symmetry and maximum efficiency. However, this would require mechanical motion and defeat the purpose of an acoustooptic deflector. If no correction is made, the angle of entry is in error by $\frac{1}{2} \alpha_d$ and the lack of symmetry reduces the efficiency of the device, as explained hereinafter. More generally, the error angle $\psi$ is the angular difference between the direction of acoustic wave propagation (the normal to the acoustic wavefronts) and the bisector of the directions of incident and diffracted light propagation. For example, if a beam-steering acoustic transducer array is used, the direction of acoustic wave propagation changes with frequency, and the error angle $\psi$ will not be simply half the change in diffracted beam angle.

For specific case of a plane acoustic wave of an amplitude which is uniform throughout a width $l$ (the optical path length across the sound beam), the useful light output would go to zero if the angle of entry were in error by $v/fl$; the diffracted light originating at any point within one half of the acoustic beam would then be cancelled by the light diffracted at a corresponding point in the other half, spaced $l/2$ from the first point. With the first nulls appearing at error angles of $\pm v/fl$, one may use $\pm \frac{1}{2}(v/fl)$ as the limits of range of angular tolerance (see "A Television Display Using Acoustic Deflection and Modulation of Coherent Light," PROCEEDINGS OF THE IEEE, Vol. 54, No. 10, October 1966, pp. 1429–1437). This is a special case of the more general situation that when the direction of the incident light is varied, the intensity of the diffracted light will vary directly as the far field radiation pattern of the sound wave (the sound wave pattern in the acoustooptic deflector spaced from the transducer). In the case of uniform amplitude across width $l$, the far field acoustic power pattern $P(\psi)/P(O)$ as a function of the error angle $\psi$ (as defined above and in more detail in U.S. Pat. No. 3,860,197 is:

$$P(\psi)/P(O) = [\sin(\pi l \psi f/v)/(\pi l \psi f/v)]^2 \qquad (5)$$

and at the above tolerance limit of $+ \frac{1}{2}(v/fl)$ the diffraction efficiency is reduced by a factor of $4/\pi^2$, or about 4dB. The angular range giving only a 3dB variation, which is more commonly used, is $+ 0.443(v/fl)$. For details and a more general equation for diffraction efficiency as a function of wavelength, the reader is directed to U.S. Pat. No. 3,869,197.

It can be seen from equation (2) that the design frequency $f_c$ for a given optical wavelength depends on that wavelength; i.e., the frequency $f_c$ for red light is lower than that for blue. It can also be shown, using equation (5), that the 3-dB operating ranges of acoustic frequency (as limied by the angular tolerance of the Bragg diffraction process) also depend on optical wavelength and do not coincide; they are in fact progressively offset. That is, the operating frequency range for blue light is shifted to higher frequencies than that for red, so that the useful ranges may overlap but do not fully coincide.

Since there is no way to operate a given deflector so that the 3-dB diffraction efficiency bandwidths for different optical wavelengths are simultaneously maximized and fully overlapping, only the central range of frequencies over which all wavelenghts are deflected (the range of overlap of their separate frequency responses) can normally be used. The minimum frequency is determined by the response for the shortest optical wavelength and the maximum frequency by the longest optical wavelength. This central range is normally only about 70% of the full 3-dB diffraction efficiency bandwidth for the shortest optical wavelength, resulting in (1) a significant reduction in the useful time-bandwidth product from the intrinsic capability of the device and (2) a corresponding reduction in the number of resolvable spots N of the scanned beam given by the equation $$N = \tau \Delta f \qquad (6)$$

where $\tau$ is the access time, i.e., the time required for the light beam to cross the acoustic wave. The reader is referred to the PROCEEDINGS OF THE IEEE, Vol. 54, No. 10, 1966, page 1430 for a derivation of equation (6).

As an example, consider the lead molybdate deflector system disclosed in co-assigned U.S. Pat. No. 3,869,197, which issued on Mar. 4, 1975 to myself and R. N. Blazey. That device has a six transducer stepped array of $l = 1.8$ cm and $f_c = 187$ MHz. Assuming red, green and blue incident light beams, the following table of offset angles $\delta$ and maximum 3-dB bandwidths were obtained by use of the equations in U.S. Pat. No. 3,869,197:

| Color/$\lambda(\mu m)$ | $\delta$(mrad.) | Min. Freq. (MHz) | Max. Freq. (MHz) | Bandwidth (MHz) |
|---|---|---|---|---|
| Red/0.647 | 1.1 | 117 | 256 | 139 |
| Green/0.521 | 1.0 | 133 | 291 | 158 |
| Blue/0.476 | 0.75 | 141 | 307 | 166 |

As can be seen from the table, the maximum common bandwidth for the three colors is from 141 MHz to 256 MHz (or a bandwidth of only 115 MHz) while the 3-dB diffraction efficiency bandwidths for red, green and blue are 130 MHz, 158 MHz and 166 MHz, respectively.

SUMMARY OF THE INVENTION

It is an object of the present invention to provide apparatus and method for diffracting light of a plurality of different wavelengths such that the diffracted light beams scan the same angular range with no more than a predetermined maximum variation of the light intensity.

It is another object of the present invention to provide apparatus and method for diffracting multiple wavelength light into a plurality of different wavelength beams which scan the same angular range at different scan rates, and to independently intensity modulate each beam with modulating signals synchronized to the scan rate of respective beam wavelengths.

In accordance with these objects, I have illustrated preferred embodiments of apparatus for diffracting light of a plurality of different selected optical wavelengths by means of an acoustooptic deflector cell. A transducer means generates variable frequency acoustic waves in the cell. The sweeping of the acoustic wave frequencies will result in diffraction of the light of the shortest wavelength over a corresponding angular range. Means are provided for selectively activating the light of the shortest optical wavelength only during these periods when the frequency of the acoustic waves is being swept within a range which will result in no more than a predetermined maximum light intensity variation. The other beams are activated only during those times in which the acoustic frequency is within a range which will result in angular diffraction ranges which match the aforesaid corresponding angular range associated with the light of shortest wavelength. As used in this specification and associated claims, the term "activated," when used with reference to a light beam, is intended to mean that the beam is caused to impinge upon an end use device when activated, the beam being turned off, deflected away, blocked, etc. so as to not reach the end-use device when not activated. An acoustic modulator is in the path of the light. Intensity modulating information is impressed upon the modulator for each of the optical wavelengths and at respective rates corresponding to the scan rate for that beam.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to accompanying drawings in which.

DESCRIPTION OF THE PREFERRED EMBODIMENTS

For many uses, it is not actually necessary that the diffracted beams be superimposed at all times, but only that they scan the same range. For instance, in photographic and other similar applications, a permanent image is to be recorded on photosensitive material or, by a transfer process, from a photosensitive medium onto a non-sensitive receiving material. Another such use might involve high-speed displays, such as television, in which the frame rate is higher than the flicker frequency of the eye.

It was shown hereinbefore, one may use $\pm 0.443(v/f)$ as the limits of range of angular tolerance of Bragg diffraction, and that function is independent of optical wavelength (although the frequency range giving this range of output angles does depend on wavelength, because the total diffraction angle is $\lambda f/v$). Hence, the range of output angles for each wavelength is almost identical if the full 3-dB diffraction efficiency bandwidth for each can be used. If, as is normally the case, the light is well collimated, the range of diffraction angles is simply twice the 3-dB angular bandwidth of the acoustic radiation pattern of the transducer array. If the beams' different wavelengths were brought in at the same angle and the acoustic radiation pattern were independent of frequency, the output-angle scan range would be independent of wavelength. In practice, of course, the ranges are not exactly identical because slightly different angles of incidence are used and the transducer radiation pattern is not independent of frequency, as included in the equations of U.S. Pat. No. 3,869,197 and as discussed in an article entitled "High-Resolution Acousto-Optical Deflector" by V. I. Balakshiy et al; RADIO ENGINEERING AND ELECTRONIC PHYSICS, Vol. 15, No. 11, 1970, pp. 2065–2071. Further beam steering such as shown in U.S. Pat. No. 3,759,603 and simple diffraction considerations must be included. Nevertheless, the useful ranges are very nearly the same if the full 3-dB diffraction efficiency bandwidth for each wavelength is used.

Figure 2:
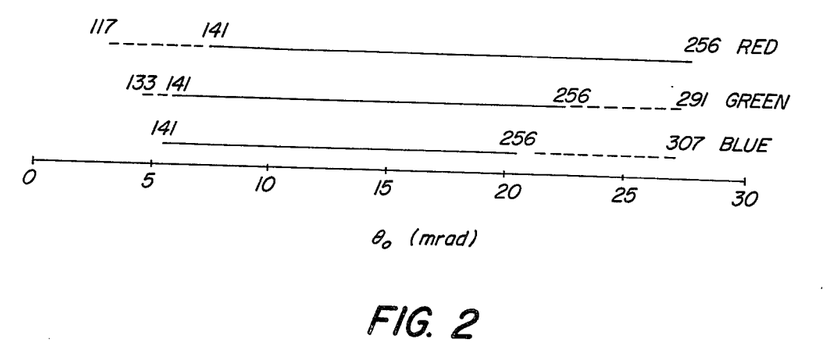
FIGS. 2 and 3 are plots of light beam output angles versus deflector acoustic wave frequency.

In FIG. 2, I have shown a plot of the output angles with respect to acoustic frequency for red, green and blue beams of respective wavelengths of 0.647 μm, 0.521 μm and 0.476 μm. The solid lines indicate the output-angle ranges corresponding to the maximum common bandwidth (141 MHz to 256 MHz) for the three colors; while the dashed extensions of the solid lines indicate the scan angle ranges available for each color if the full 3-dB diffraction efficiency bandwidth for that color were used. Note that a full discussion of the theory for FIG. 2 appears in U.S. Pat. No. 3,759,603.

Figure 3:
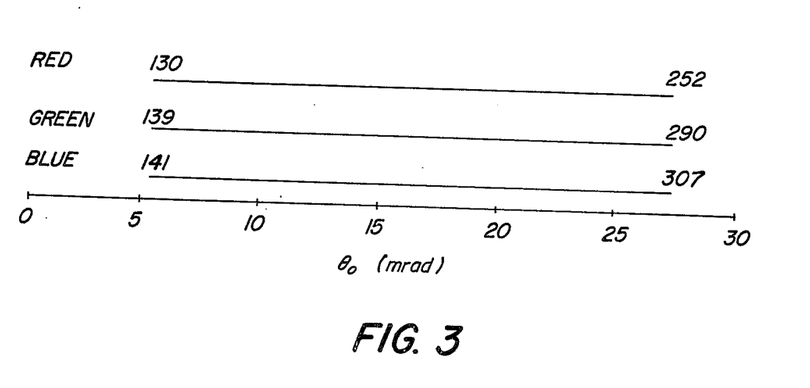

From FIG. 2, it can be seen that the smallest angular range (5.5 mrad. to 27.2 mrad.) is available for the blue beam. This range can be matched by the red and green beams, as shown in FIG. 3, if the acoustic frequency is swept from 130 MHz to 307 MHz and each color beam is activated only during the following frequency ranges:

| Color | Frequency Range | Δf |
|---|---|---|
| Red | 130 MHz to 252 MHz | 122 MHz |
| Green | 139 MHz to 290 MHz | 151 MHz |
| Blue | 141 MHz to 307 MHz | 166 MHz |

Hence, if the acoustic transducers are operated over a frequency range of 130 MHz to 307 MHz, no external achromatizing optics are required even though the frequency range has been expanded beyond the maximum common bandwidth of 141 MHz to 256 MHz for the three colors. However, because the three beams scan the same angular displacement at different relative rates, intensity modulating information for each color must be impressed on the appropriate color carrier at the proper rate during the scan. This concept will be fully discussed hereinafter.

The number of resolvable spots along a scan line depends on the distribution of illumination at the limiting aperture of the optical system and the criterion for spot separation as well as on the before-mentioned time-bandwidth product of the deflector. We consider the case of illumination by a gaussian beam truncated at the $e^{-2}$-irradiance points and use the classical Rayleigh resolution criterion, by which spots are considered to be resolved if they overlap at 40.5% irradiance. In this case equation (6), the number N of resolvable spots, is modified to $$N = \tau \Delta f / 1.16 \tag{7}$$

If for each wavelength, the full frequency ranges shown in FIG. 3 are used and the access time is 13.8 μsec. (the access time of a 50-mm aperture for PbMoO₄), the bandwidth, time-bandwidth product, and number of spots for each color are:

| | Δf | τΔf | N |
|---|---|---|---|
| Red | 122 MHz | 1684 | 1451 |
| Green | 151 | 2084 | 1796 |
| Blue | 166 | 2291 | 1975 |

We note that N differs for the various colors. The optical spot numbers may be equalized by reducing the size of the green and blue beams, thus reducing their corresponding values of τ to equalize the three time-bandwidth products. However, for visible-light displays, the resolution in green light is often the most important and it may not matter if the red and blue spot sizes are somewhat different.

Figure 4A:
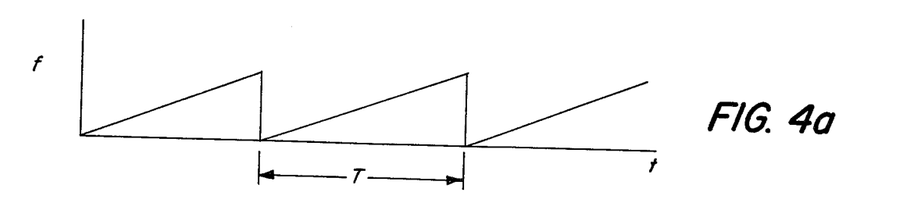
FIGS. 4a and 4b are plots of deflector acoustic wave frequency versus time.
Figure 4B:
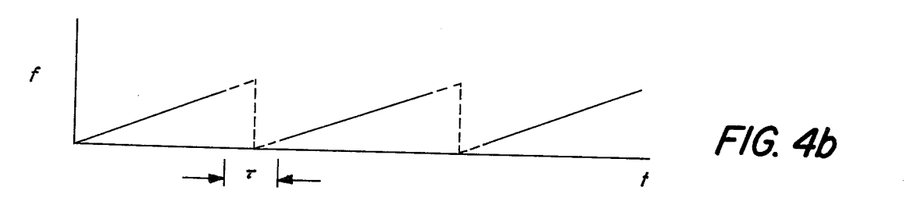

An additional advantage of the system described here may be understood as follows. Some of the resolution calculated above is lost even when only one wavelength of light is being deflected when the acoustic drive frequency is swept linearly with time in a sawtooth manner because the full sweep is not available for useful output. This is illustrated in FIGS. 4a and 4b. In FIG. 4a, a typical sawtooth wave of frequency versus time is shown; this describes the frequency variations of the signal driving the deflector. The effective frequency at any time, which determines the mean spot position, is given by the acoustic wave frequency averaged over the deflector aperture. In FIG. 4b, during the time period τ when the scan is restarting, the frequency of the acoustic wave in the aperture does not vary linearly with position across the aperture, but rather there is a portion of the aperture having a high frequency acoustic wave and another portion with a low frequency wave. Hence, there are two output spots, each dimmer and larger than the single spot during the central part of the scan. The useful part of the scan range is of duration T-$\tau$, where T is the scan time. Because of this loss, the useful time-bandwidth product is reduced by the factor $(1-\tau/T)$. In multiple-color operation using only the common bandwidth, this same loss factor applies to all colors.

For the method of multi-color operation described here using a larger frequency sweep, a different section of which is used for each color, the principle is the same but the losses differ for each color. As before, a time interval of length $\tau$ at the start of the sweep is not useful. Letting the time interval after which the $i^{th}$ color display begins be $\delta t_i$, and the time during which that color is displayed be $T_i$, the time-bandwidth product reduction factor for this color is $$1 - (\tau - \delta t_i)/T_i$$

if $\delta t_i < \tau$, or
0 if $\delta t_i \geq \tau$.

For red light, for example, the full interval $\tau$ is lost. For blue, the display of which begins $\delta t_3$ later, only the interval $(\tau - \delta t_3)$ is lost.

Because the red, green and blue spots scan at different speeds, the information for each color for one scan line must be impressed on the appropriate color carrier by a modulator at the appropriate rate during the scan. For example, the frequency range required to scan blue light is larger than that for red, as shown in FIG. 3; a longer time is therefore required for the blue spot to complete the scan, and the information must be impressed on the blue beam at a lower rate than for red.

Figure 5:
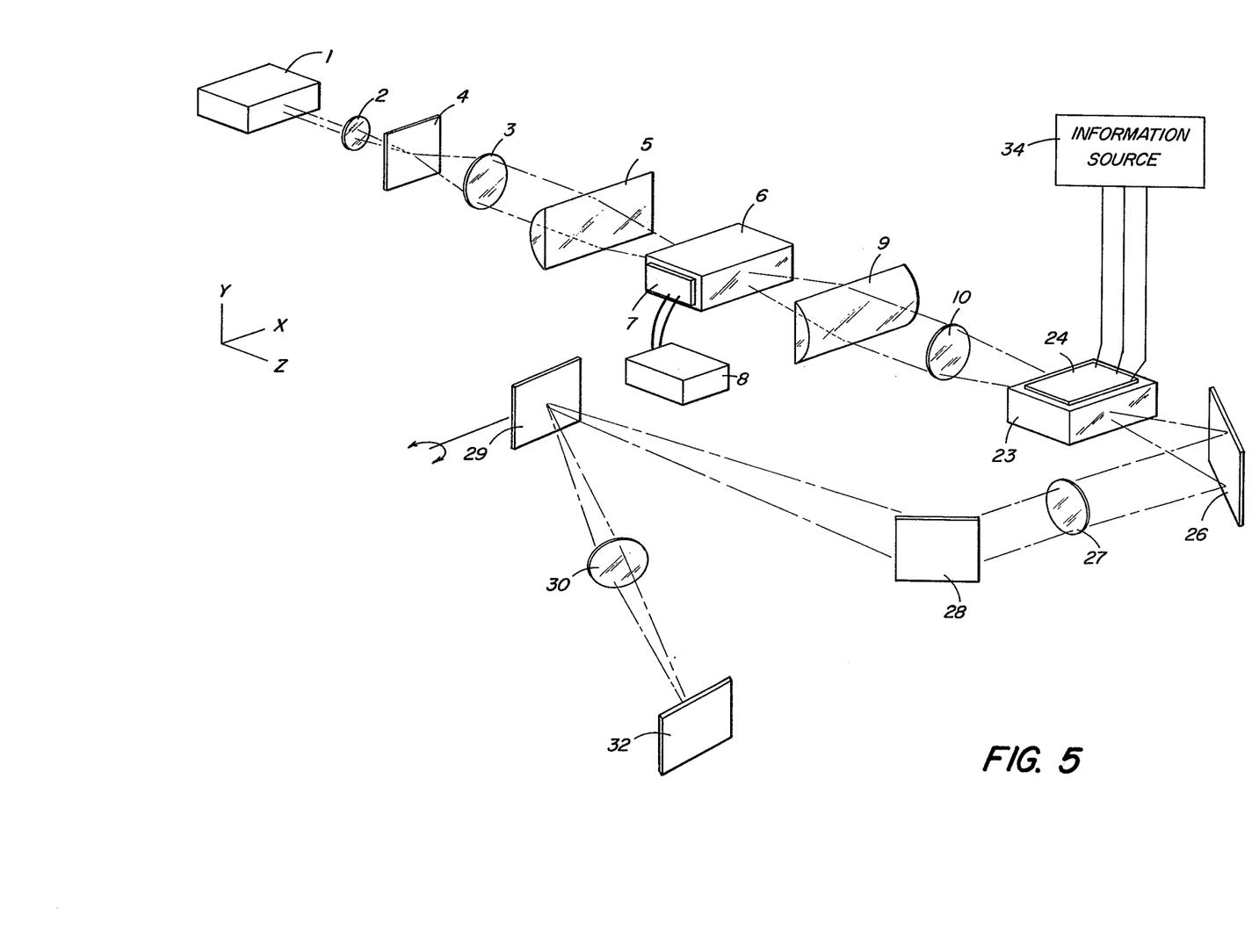
FIG. 5 is a schematic drawing of a representative system suitable for use with the present invention.

A schematic of a representative system adapted for use with the present invention is shown in FIG. 5. A light source 1 may be a laser radiating three appropriate wavelengths of red, green and blue light. An optical system comprising spherical lenses 2 and 3, spatial filter 4, and cylindrical lens 5 expands the beam and brings it to a line focus at the center of a deflector 6, in which propagates an acoustic wave from a transducer 7 controlled by a driver 8. The line focus and the direction of acoustic wave propagation are parallel to the x-axis shown in the drawing. A cylindrical lens 9 regenerates a circular, collimated beam which is focused by positive spherical lens 10 onto a 3-color modulator 23 such as shown in R. A. Spaulding's U.S. Pat. No. 3,783,185, where the direction of the acoustic wave propagation from a transducer 24 is parallel to the y-axis, perpendicular to the deflection plane defined by the x-z axis. Hence, the motion of the focused spot in the modulator has no effect on its modulation. The modulated light is reflected by mirrors 26 and 28 and focused by lens 27 onto a galvanometer mirror 29 for slow deflection of the light. The reflected light is focused by lens 30 onto display plane 31, which may be a screen for direct viewing or a photosensitive surface for recording. Synchronized rotation of mirror 29 provides scanning of the light beams along the display plane in the y direction.

A number of variations of this basic system may be used: (1) two or three lasers may be used having their beams combined before entering deflector 6; (2) three separate modulators may be used, with the different colors of light separated before modulation and afterward recombined; (3) alternative methods of slow deflection, such as the use of either a second acoustooptic cell or motion of the transparency and the output-plane, could be used instead of galvanometer mirror 29; and (4) a non-acoustic diffractive deflector, such as magnetooptic, liquid crystal, ferroelectric, etc., device, could be used instead of the acoustooptic device illustrated. Finally, other variations in optical design and embodiment will be evident to persons skilled in the art.

The input information is generated externally at 34 as for example by a television signal or a signal from an external scanner, and, in prior art systems, the information for all three colors is fully synchronous. Modulator 23 with its spherical lenses can precede the deflector and its cylindrical lenses in the optical path. This change would reduce the modulator aperture height required. Multi-color information processing can be carried out, if needed, since the information for each spot for all three colors is simultaneously available.

Figure 6:
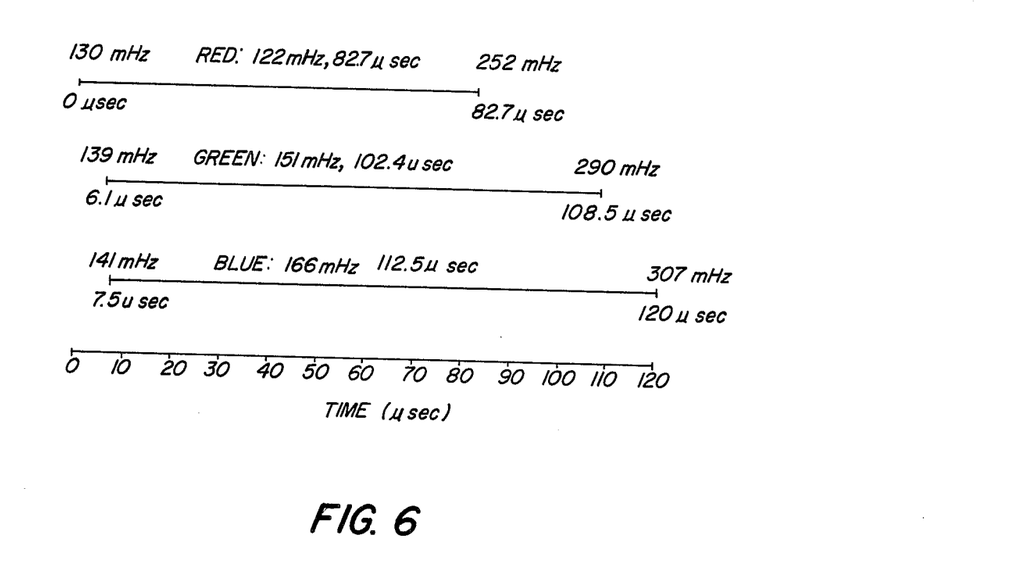
FIG. 6 is a timing diagram.

As opposed to the prior art systems in the present invention, the output rate from information source 34 is different for each color, i.e., not synchronous with the input. Accordingly, the information for each color for one scan line must be clocked out to modulator 23 at the appropriate time and rate for that color during the scan. Consider for example a deflector operated as in FIG. 3, and assume an active line time (the time during which the full frequency sweep from 130 to 307 MHz occurs) of 120 $\mu$sec. A timing diagram for this case is shown in FIG. 6, where each line gives the sweep-frequency range and time interval for one color. For green light, for example, the information must be delivered to modulator 23 during the interval from 6.1 to 108.5 $\mu$sec. after the start of the scan. There are at least two methods of performing the required rate conversion, one using shift registers long enough to store an entire scan line and the second using variable delay lines.

Figure 7:
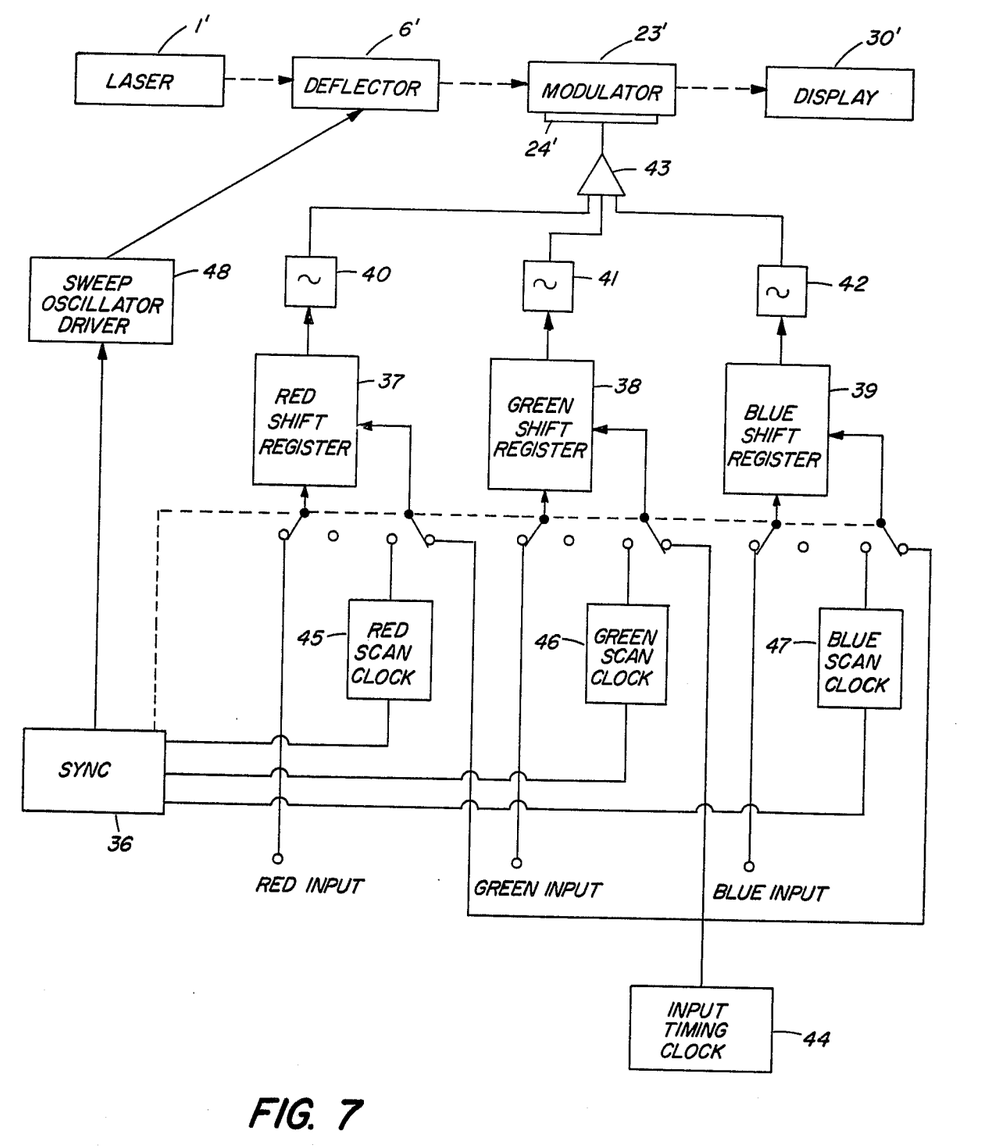
FIG. 7 is a simplified block diagram of the electronics for one embodiment of the present invention.

A simplified block diagram of the electronics for the shift register method of performing rate conversion is shown in FIG. 7, wherein laser 1', deflector 6', modulator 23' and display 30', along with their associated optical elements (not shown in FIG. 7) are the same as those shown in FIG. 5.

Six ganged switches, driven together by a synchronizer 36 control the inputs to red, green and blue shift registers 37, 38 and 39. The switches may be electronic or mechanical. The outputs of the shift registers respectively control the amplitudes of three signal generators 40, 41 and 42 in accordance with the relative intensities of the color components of the point to be displayed at 30'. The outputs of generators 40-42 are fed to a summing amplifier 43 which applies the signals amplified thereby to transducer 24' mounted on acoustooptic modulator 23'.

During the input period, the ganged switches are as shown in FIG. 7. Each shift register is connected to its respective color input and to an input timing clock 44. The use of a common input timing clock for all three shift registers ensures synchronism of register loading. After loading, synchronizer 36 causes all six ganged switches to change state to connect shift registers 37-39 to red, green and blue output scan clocks 45-47, respectively. Each output scan clock is started at an appropriate time by a pulse from the synchronizer. For instance, in the illustrative example, synchronizer 36 starts the linear sweep of deflector driver 48, simultaneously starting clock 45 to transfer the stored information from red shift register 37 to amplifier 43. This clock operates at the frequency $f_r$ which completely unloads the register in 82.7 $\mu$sec., the time in which driver 48 reaches a frequency of 252 MHz and the red spot has completed its scan. At 6.1 μsec. after the start of the scan, synchronizer 36 starts clock 46 at frequency $f_2$ to activate the green beam by delivering the green-light information to amplifier 43. At 7.5 μsec., clock 47 starts to employ register 39. At the end of 120 μsec., when all three scans are completed, driver 48 is reset and the information for the next scan is clocked into the shift registers so that the process can be repeated.

The above-described system has the disadvantage that continuous input is not possible because read-in and read-out must occur sequentially; the input scanner must stop while the stored information is displayed. However, this problem may be overcome by providing a second set of three shift registers; one set can be loaded while the other is being read out. A simple set of switches is used to interchange the register sets for the subsequent scan. Hence, the sets are used alternately, and both input and output are continuous.

The memory units may be either digital shift registers as in FIG. 7 or analog elements such as charge-coupled devices. The latter offer simplicity of use, but the former will permit higher speed operation and are more suited for systems capable of distinguishing many levels of a gray scale. As an example of the data rates required, we consider the deflector described above, used to give a 120-μsec scan according to FIG. 6, and require that each scan line contain 1500 spots. (The number of image samples per scan line, which is equal to the number of cells in each memory channel, need not be equal to the number of spots resolvable by the deflector, although in general the numbers will be similar.) The time per spot for a given color is then T/1500, where T is the active scan time for that color as shown in FIG. 6. The spot rate (the rate at which information is clocked out of the memory elements), the error in spot rate corresponding to 0.1 spot at the end of the scan, the initial delay, and the error in delay corresponding to 0.1 spot are:

| Color | Spots/sec | Spot rate error for 0.1 spot | Initial Delay | Delay error for 0.1 spot |
|---|---|---|---|---|
| Red | $18.1 \times 10^6$ | $1.2 \times 10^3$ | μsec | 5.5 nsec |
| Green | $14.6 \times 10^6$ | $1.0 \times 10^3$ | 6.1 μsec | 6.8 nsec |
| Blue | $13.3 \times 10^6$ | $0.9 \times 10^3$ | 7.5 μsec | 7.5 nsec |

As noted above, another method of rate conversion makes use of variable delay lines. Rather than storing the information for an entire scan line and clocking it out at a different rate in a later operation, it is actually only necessary to adjust the rates of the three channels by inserting a linearly increasing delay in the green and blue channels. Consider the timing diagram of FIG. 6. If the input scanner delivers its information in 82.7 μsec and then waits the remainder of 120 μsec before beginning the next scan, the red information may be transmitted directly to the modulator for display. We need only delay the start of the green output by 6.1 μsec and the blue by 7.5 μsec, and then clock out the green and blue information with progressively longer delays so that the green line is complete and 180 μsec and the blue at 120 μsec. Because the beams are nearly superimposed at the start of the scan and separate linearly in time, the delays required in the green and blue channels increase linearly with time also.

Such a linear variation of delay may be provided in several ways. The first uses an analog or digital shift register driven by a clock oscillator whose frequency is decreased linearly with time. It is only necessary to store the amount of information in that fraction of the scan between the end and the position of the blue beam when red reaches the end, typically about 25% of a line for blue. The clock period of the shift register should be less than the time per resolved spot so that the effective sampling rate of the scanner is not reduced and to avoid sampling artifacts. Alternatively, other variable delay lines such as the continuously variable, double acoustooptic cell devices well known in pulse-compression radar signal processing may be used.

In another type of system, the original information is a fixed object, and multi-color image processing is required. Such processing may involve application of unsharp masking techniques, gamma correction, buffering, etc. as described in co-pending U.S. patent application Ser. No. 580,632, filed May 27, 1975, in the name of J. H. Ladd. In this type of system, the same beams are to be used for both scanning and display, as shown in FIG. 6 of aforementioned U.S. Pat. No. 3,783,185, rather than having a separate object scanner. If the same scheme is used in both scan and display, the inputs 34 are necessarily not synchronous. An example of such a system is a scanning printer for photographs. There are three possible approaches, using different combinations of full-line storage and partial-line storage with variable delay.

Figure 8:
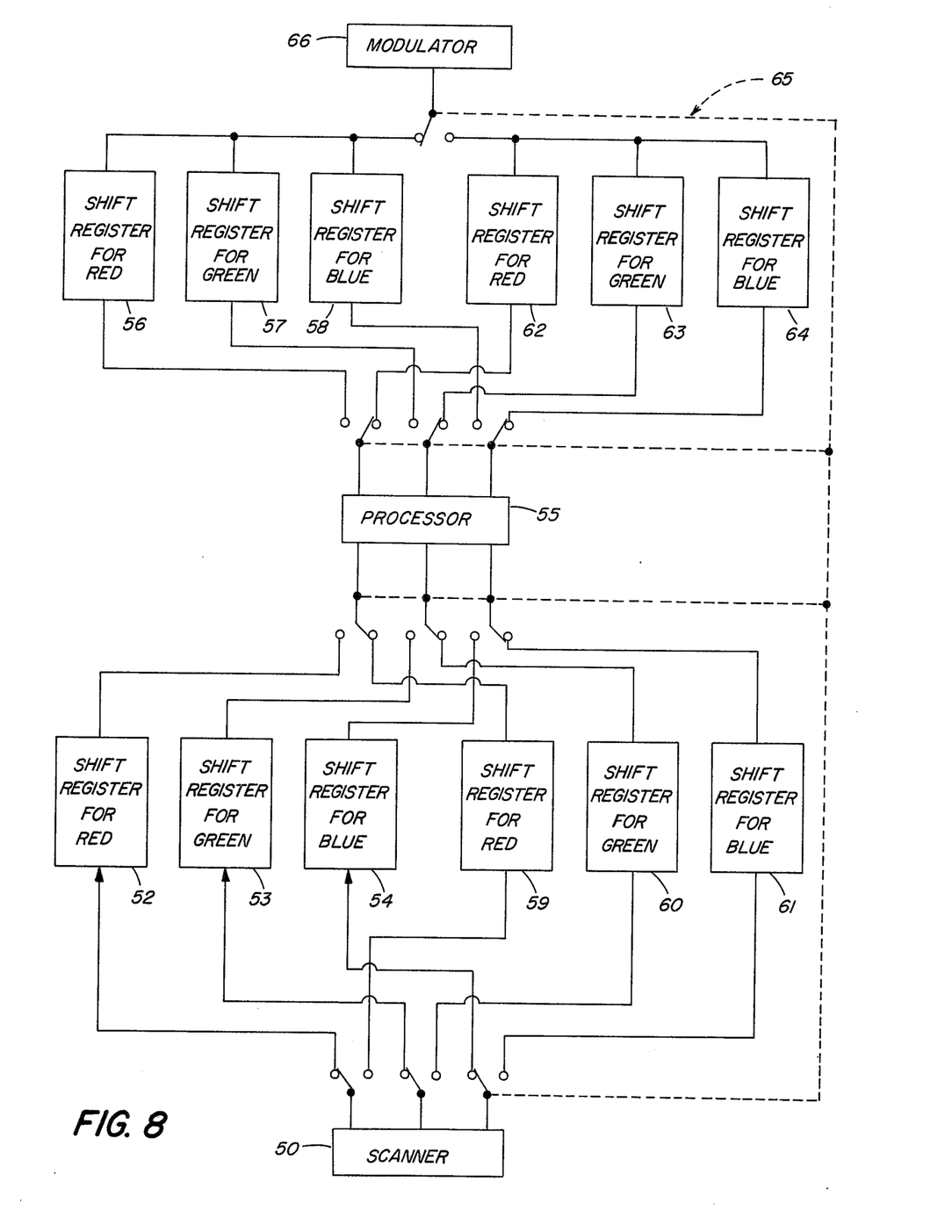
FIG. 8 is a simplified block diagram of the electronics for another embodiment of the present invention.

In the first approach, diagrammed in FIG. 8, the printing operation is delayed relative to scanning by one or two lines to allow time for processing. The red, green and blue signals from scanner 50 (the outputs of detectors 276–278 of FIG. 6 of U.S. Pat. No. 3,783,185) are loaded into three shift registers, 52, 53 and 54 at the appropriate rates so that each register is filled at the end of the scan period for that color. In the next step, the information is synchronously clocked out to electronic processor 55. Clock pulse sources are not shown, but would be similar to those described with respect to FIG. 7. The processed data is loaded into a second set of registers 56, 57 and 58 for transmission to the modulator at appropriate rates; these registers perform the same function as registers 37–39 of FIG. 7, and the rest of the basis electronics are as shown in FIG. 7.

The system as described operates with a one-line delay: one sweep of the deflector is used to scan the object and the next for display. In order to provide continuous operation, another set of input registers 59–61 and another set of output registers 62–64 are used along with ganged switches 65. While one input set (52–54 for example) is being loaded from the scanner, the information from the previous scan stored in the second input set (59–61) is being clocked into processor 55 and loaded into output set 62–64. Simultaneously, the processed information from the scan before that, in registers 56, 57 and 58, is being transmitted to the display. At the end of the scan, switches 65 are thrown and the registers exchange functions. By this process of alternation and two-line delay each deflector sweep is used both for input and output, doubling the throughput rate of the system.

In the second approach, half of the shift registers (either the two input sets or the two output sets) are replaced by variable delay lines. If shift registers are used between the object scanner and the processor, they must be read out at the rate appropriate for the red scan; then delay lines for green and blue may be used between processor and modulator exactly as described for the second type of system. Alternatively, delay lines may be used between the scanner and processor and shift registers between processor and modulator. In this case the information is received by the processor at the slower blue-scan rate.

Figure 9:
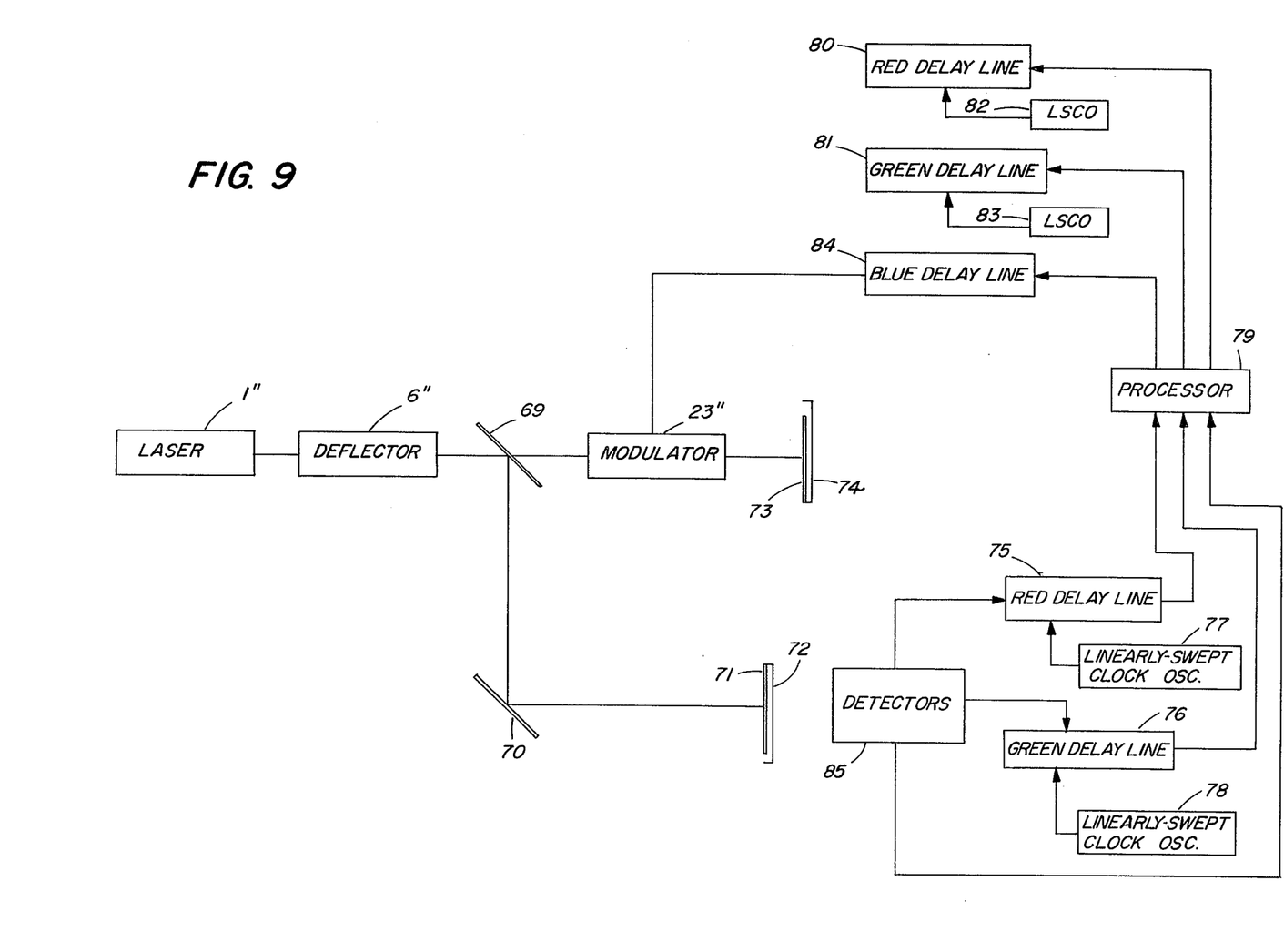
FIG. 9 is a simplified block diagram of the electronics for still another embodiment of the present invention.

Finally, in the third approach, it is possible to use delay lines on both sides of the processor, but a larger deflector time-bandwidth product is required for a given display resolution. The idea may be understood with reference to the schematic layout of FIG. 9. Part of the light from laser 1" and deflector 6" is diverted by a beamsplitter 69 and mirror 70 and scans object 71 which occupies the first part, but not all, of the total scan range 72. The remainder of the light is transmitted through modulator 23" and used to display image 73, occupying the latter part of the equivalent total scan range 74. The red and green information from a given point of the object is delayed appropriately by delay lines 75 and 76, driven by linearly-swept clocks 77 and 78, until the more slowly-moving blue beam reaches the point; at that time the information from the point is all available and may be processed at 79. Only about one quarter of a scan line at most must be stored in the delay elements. Because the information from the detectors arrives at the processor at the slow blue-scan rate, the processor output for red and green must be speeded up. Therefore three delay lines are used: delay lines 80 and 81 for red and green are driven by clocks 82 and 83 whose frequencies increase with time to give higher output than input rates, while delay line 84 for blue gives only a fixed delay.

Figure 10:
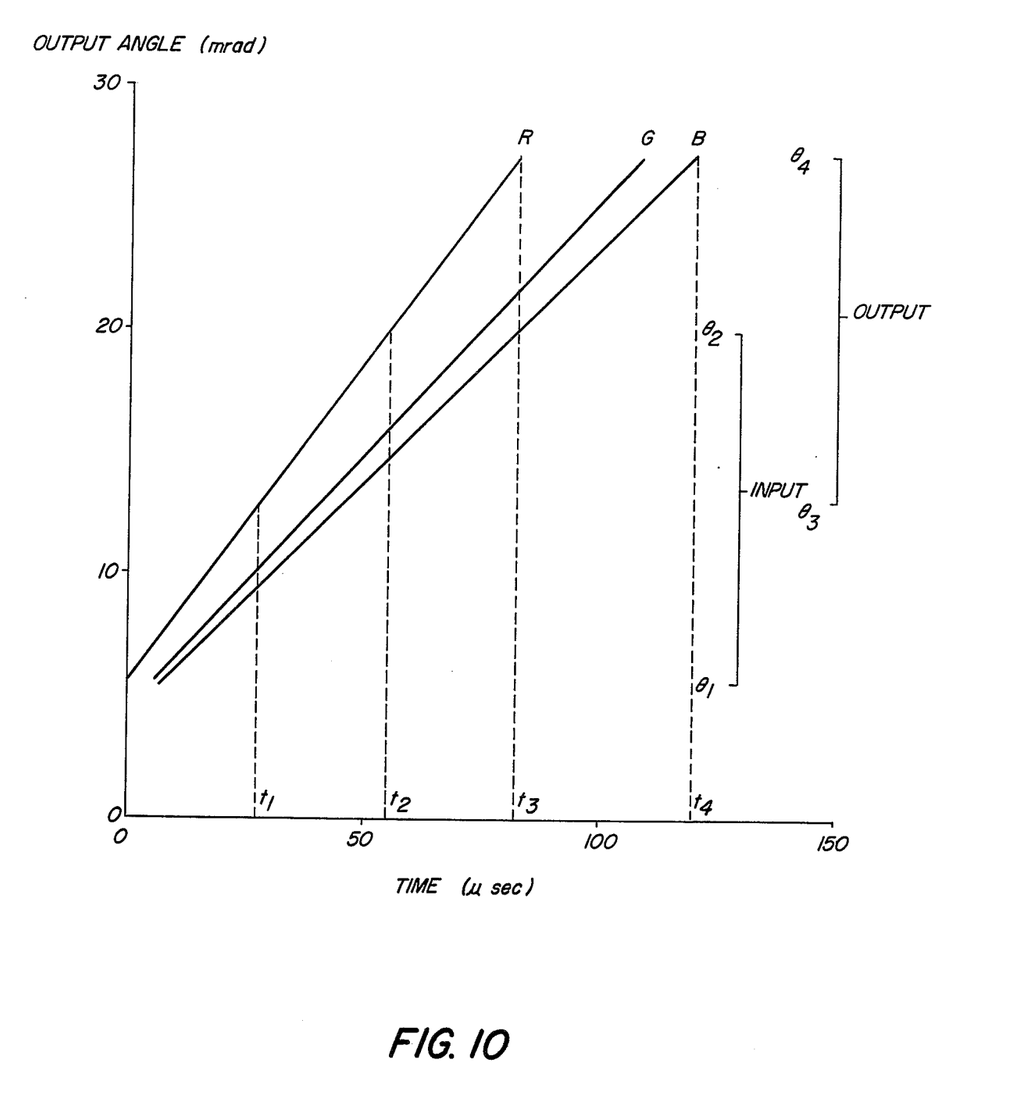
FIG. 10 is a plot of beam position versus time.

A plot of beam position versus time for the three colors, from which the appropriate timing and resolution may be determined, is shown in FIG. 10. For this numerical example we again use a deflector operated as in FIG. 6. The red scan of the object begins at angular position $\theta_1$ and time zero and ends at position $\theta_4$ and time $t_3$, at the end of the image. At $t_3$, the blue scan reaches the end of the object; this determines angle $\theta_2$ and hence the angular range $\theta_2-\theta_1$ that the object may subtend. Also, we see that the red beam completed its object scan by reaching $\theta_2$ at time $t_2$; thus the maximum delay required is $t_3-t_2$.

The image will subtend the same angle as the object. Therefore we have $\theta_4-\theta_3 = \theta_2-\theta_1$, and the angle $\theta_3$ at which the image begins is specified. The red beam begins to scan the image at time $t_1$; this determines the initial delay of line 80. Of the full deflection range available, $27.2 - 5.5 = 21.7$ mrad, the part usuable for either object or image is 14.5 mrad. Therefore, in this example the use of delay lines exclusively and no full-line storage requires 50% more deflector time-bandwidth product.

In normal multiple-color operation of swept-mode deflectors, the time-bandwidth product used is significantly less than that allowed by Bragg tolerance for any one color alone, especially for the shorter wavelengths. In addition, the use of several deflectors and/or external achromatizing elements is awkward. The use of storage registers or delay lines increases the usable fraction of Bragg-tolerance bandwidth and avoids the necessity for multiple deflectors and external optical achromatizing elements. Higher resolution is achieved with a simplified optical system.

The invention has been described in detail with particular reference to a preferred embodiment thereof, but it will be understood that variations and modifications can be effected within the spirit and scope of the invention.

I claim:

1. Apparatus for diffracting light of a plurality of different selected optical wavelengths including a first wavelength and at least one other wavelength longer than said first wavelength, said apparatus diffracting the light into a plurality of respectively different wavelength beams such that the diffracted light beams scan the same angular range with no more than a predetermined maximum variation of the light intensity, said apparatus comprising:
   an acoustooptic deflector cell in the path of the light;
   means for generating variable frequency acoustic waves in said cell;
   means for selectively activating the light of said first wavelength only during those times during which said variable frequency is within a range which will result in no more than said predetermined maximum light intensity variation, and for selectively activating the light of said other wavelengths only during those times during which said variable frequency is within a range which will result in angular diffraction ranges which will match the angular diffraction range of the diffracted light of said first wavelength when activated.

2. Apparatus as defined in claim 1 further comprising means for independently intensity modulating the diffracted light beams, said modulating means comprising:
   an acoustooptic modulator in the path of the light; and
   means for impressing, upon said modulator, intensity modulating information for each of said selected optical wavelengths at respective rates corresponding to the respective duration of light activation.

3. Apparatus comprising:
   means for diffracting light of a plurality of different optical wavelengths into a plurality of respectively different wavelength light beams such that the diffracted light beams scan the same angular range at differetn scan rates; and
   means for independently intensity modulating the diffracted light beams by separately synchronizing a series of modulating signals to the respective scan rates of each of the different wavelength light beams.

4. Apparatus as defined in claim 3 wherein said modulating means comprises:
   an acoustooptic modulator in the path of the light; and
   means for impressing, upon said modulator, intensity modulating information for each of said optical wavelengths at rates corresponding to the respective scan rage of each respective beam.

5. Apparatus for diffracting light of a plurality of different selected optical wavelengths including a first wavelength and at least one other wavelength longer than said first wavelength, said apparatus diffracting the light into a plurality of respectively different wavelength light beams such that the diffracted light beams scan the same angular range with no more than a predetermined acceptable variation of the light intensity, said apparatus comprising:
   an acoustooptic deflector cell in the path of the light;
   means for generating acoustic waves in said cell, the frequency of said acoustic waves sweeping a bandwidth which includes the minimum and maximum frequencies which will result in no more than said predetermined variation of the light beam of said first wavelength; and means for selectively activating the light of each of said selected optical wavelengths only during respective active scan times during that portion of said acoustic wave frequency sweeps when said frequency is within a range which will result in angular diffraction ranges which will match the angular diffraction range of the diffracted light of said first wavelength when the acoustic wave frequency is swept between said minimum and maximum frequencies.

6. Apparatus as defined in claim 5 further comprising means for independently intensity modulating the diffracted light beams, said modulating means including:
an acoustooptical modulator in the path of the light; and
means for impressing, upon said modulator, intensity modulating information for each of said selected optical wavelengths (1) only during said respective active scan times and (2) at respective rates corresponding to the respective durations of said active scan times.

7. Apparatus as defined in claim 6 wherein said impressing means comprises:
means for generating said intensity modulating information;
memory means for storing said intensity modulating information for each of said selected optical wavelengths; and
clock means, associated with said memory means, for causing said stored information to be applied to said modulator during said respective active scan times and at said respective rates.

8. Apparatus as defined in claim 7 wherein said memory means comprises a shift register for storing the intensity modulating information for each of said selected optical wavelengths.

9. Apparatus as defined in claim 6 wherein said impressing means comprises:
means for generating said intensity modulating information for each of said selected optical wavelengths; and
means for transmitting said generated information to said modulator by (1) delaying the start of the information for each of said selected optical wavelengths, except the longest such wavelength, until said acoustic wave frequency is within the respective matching range for that wavelength and (2) progressively delaying the transmission rate of the information for each of said other selected optical wavelengths.

10. Apparatus as defined in claim 9 wherein said transmitting means comprises:
a shift register for storing the information for each of said other selected optical wavelengths; and
clock means for driving said shift registers, said clock means having predetermined frequencies which decrease linearly during said active scan time.

11. A method of diffracting light of a plurality of different selected optical wavelengths in a manner such that the diffracted light beams scan the same angular range with no more than a predetermined acceptable variation of the light intensity, said method comprising:
generating, in an acoustooptic deflector cell in the path of the light, variable frequency acoustic waves which sweep over frequencies which include a first range of frequencies which will result in intensity variation of a light beam having the shortest of said selected wavelengths not to exceed said predetermined attenuation; and
selectively activating the light of each of said selected wavelengths only during respective active scan times during that portion of said acoustic wave frequency sweeps when the frequency is within a range which will result in angular diffraction ranges for each such beam which match the angular diffraction range of said beam of shortest wavelength when said acoustic wave frequency is swept over said first range.

12. A method as defined in claim 11 further comprising the step of independently intensity modulating the diffracted light beams by impressing, upon an acoustooptic modulator in the path of the light beams, information for each of the diffracted light beams (1) only during said respective active scan times and (2) at respective rates corresponding to the respective durations of said active scan times.

* * * * *